United States Patent
Girard et al.

(10) Patent No.: US 9,249,930 B2
(45) Date of Patent: Feb. 2, 2016

(54) VALVE GREASING SYSTEM

(71) Applicant: SAFESEAL VALVE SYSTEMS CORP., Calgary (CA)

(72) Inventors: Denis Girard, Drayton Valley (CA); Jim Bass, Worsley (CA)

(73) Assignee: SAFESEAL VALVE SYSTEMS CORP., Calgary (CA)

( * ) Notice: Subject to any disclaimer, the term of this patent is extended or adjusted under 35 U.S.C. 154(b) by 217 days.

(21) Appl. No.: 13/864,495

(22) Filed: Apr. 17, 2013

(65) Prior Publication Data

US 2013/0292208 A1    Nov. 7, 2013

(30) Foreign Application Priority Data

May 3, 2012   (CA) .................................... 2775914

(51) Int. Cl.
   *F16N 11/08*   (2006.01)
   *F16N 11/10*   (2006.01)
   *F16N 13/16*   (2006.01)

(52) U.S. Cl.
   CPC ............. *F16N 11/08* (2013.01); *F16N 11/10* (2013.01); *F16N 13/16* (2013.01)

(58) Field of Classification Search
   CPC .......... F16N 11/08; F16N 11/10; F16N 13/16; F16K 25/02; F16K 51/00
   USPC ............................................................ 184/6
   See application file for complete search history.

(56) References Cited

U.S. PATENT DOCUMENTS

| | | | |
|---|---|---|---|
| 3,033,225 A | 5/1962 | Kerr | |
| 3,280,835 A | 10/1966 | Hill et al. | |
| 3,282,287 A | 11/1966 | Fowler | |
| 3,788,427 A * | 1/1974 | Fox et al. | 184/105.3 |
| 4,044,924 A | 8/1977 | Saretzky | |
| 4,180,090 A | 12/1979 | Bemba | |
| 4,199,858 A * | 4/1980 | Meijs | 29/458 |
| 4,397,214 A * | 8/1983 | Mannhart et al. | 89/1.25 |
| 4,609,073 A | 9/1986 | Knaebel | |
| 6,068,164 A * | 5/2000 | Totaro | 222/389 |
| 2005/0062006 A1* | 3/2005 | Wilfert | 251/174 |
| 2011/0132687 A1* | 6/2011 | Ifield | 184/6.23 |
| 2013/0313051 A1* | 11/2013 | Hung | 184/41 |
| 2014/0130830 A1* | 5/2014 | Loussaert | 134/18 |

* cited by examiner

*Primary Examiner* — William E Dondero
*Assistant Examiner* — Robert T Reese
(74) *Attorney, Agent, or Firm* — Bennett Jones LLP

(57) ABSTRACT

A system for greasing a valve is provided. The system comprises a main valve connected to a compressed fluid source, a grease supply system, a main chamber, a left head assembly, a right head assembly, and a grease supply line in communication with the valve. The main chamber includes a piston that is slidable from a first end to a second end of the main chamber. In the first position, the main valve injects fluid into the first end of the main chamber, thereby charging the left head assembly with grease and simultaneously discharging grease from the right head assembly into the grease supply line. In the second position, the main valve injects fluid into the second end of the main chamber, thereby charging the right head assembly with grease and simultaneously discharging grease from the left head assembly into the grease supply line.

19 Claims, 1 Drawing Sheet

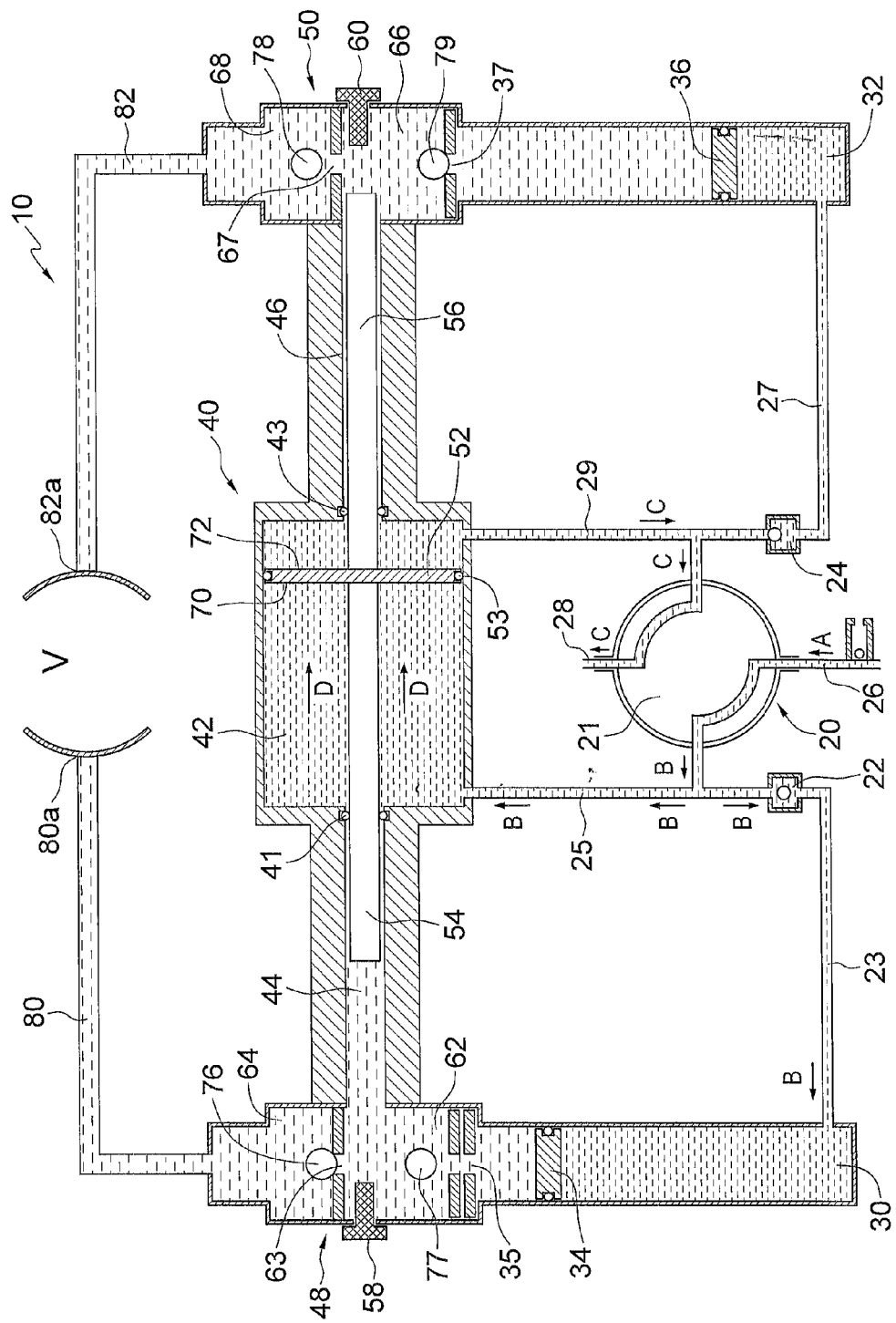

VALVE GREASING SYSTEM

FIELD OF THE INVENTION

The present invention relates to a system for greasing valves.

BACKGROUND TO THE INVENTION

For some industrial operations, such as oil production, valves require regular greasing and this is usually done by injecting grease through seat injection ports of the valves.

SUMMARY OF THE INVENTION

A system for greasing a valve comprising: a main valve connected to a compressed fluid source, the main valve having a first position and a second position; a grease supply system having a supply of grease; a grease injection assembly comprising a main chamber, a left head assembly and a right head assembly, the grease injection assembly being in communication with the grease supply system and at least one grease supply line, and the at least one grease supply line being connectable into communication with the valve; and the main chamber having a piston therein, the piston being slidable from near a first end to near a second end of the main chamber, and forming a fluid seal between the first and second ends, and the main chamber being positioned between and connected to the left head assembly and right head assembly; wherein in the first position, the main valve injects fluid into the first end of the main chamber, moving the piston towards the second end and simultaneously exhausting fluid from the second end, thereby charging the left head assembly with grease from the grease supply system, and simultaneously discharging grease from the right head assembly into the at least one grease supply line; and wherein in the second position, the main valve injects fluid into the second end of the main chamber, moving the piston towards the first end and simultaneously exhausting fluid from the first end, thereby charging the right head assembly with grease from the grease supply system, and simultaneously discharging grease from the left head assembly into the at least one grease supply line.

BRIEF DESCRIPTION OF THE DRAWINGS

The present invention is illustrated by way of example, and not by way of limitation, in detail in FIG. 1, wherein:

FIG. 1 is a schematic diagram of a valve greasing system.

DETAILED DESCRIPTION

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Referring to FIG. 1, the valve greasing system 10 comprises an actuator 20 comprising a main valve 21 and an inlet 26 connected to a compressed fluid source (not shown), a grease supply system comprising two grease supply chambers 30 and 32, a grease injection assembly 40, and grease supply lines 80 and 82 connectable at their ends 80a, 82a to a valve V to be greased. System 10 may be installed at the valve such that it can be used when necessary.

In one embodiment of system 10, grease injection assembly 40 comprises a main chamber 42, a left channel 44, a right channel 46, a left head assembly 48, a right head assembly 50 and a piston 52 including a left plunger 54 and a right plunger 56. Left channel 44 and right channel 46 each have a first end and a second end. Main chamber 42 is disposed between, and connected to, the first ends of left channel 44 and right channel 46. In one embodiment, the inner cross-sectional area of main chamber 42 is greater than that of each of channels 44 and 46. Left head assembly 48 comprises a grease drive chamber 62 and an outlet chamber 64. Chambers 62 and 64 are in fluid communication with one another via a small opening 63 therebetween. Right head assembly 50 comprises a grease drive chamber 66 and an outlet chamber 68. Chambers 66 and 68 are in fluid communication with one another via a small opening 67 therebetween. One way check valves 76 and 78 may be positioned to act in openings 63, 67 respectively, to restrict the flow of fluids to only one direction, i.e., from grease drive chambers 62 and 66 to outlet chambers 64 and 68, respectively. Outlet chambers 64 and 68 are in fluid communication with grease supply lines 80 and 82, respectively. The second end of left channel 44 is connected to, and in fluid communication with, grease drive chamber 62. The second end of right channel 46 is connected to, and in fluid communication with, grease drive chamber 66.

Main chamber 42 houses piston 52, which has two piston faces 70 and 72 on opposite sides thereof. Extending perpendicularly from piston faces 70 and 72 are left plunger 54 and right plunger 56, respectively. The free end of left plunger 54 extends into left channel 44. Likewise, the free end of right plunger 56 extends into right channel 46. In another embodiment, piston 52 is sealed by seal 53 along its circumference such that no fluids can be exchanged between the spaces on either side of piston 52. Grease injection assembly 40 includes seals 41 and 43 at the junctions between main chamber 42 and channels 44 and 46, so that plungers 54, 56 can slide therethrough but there is no exchange of fluids therebetween.

Grease drive chamber 62, 66 is in fluid communication with one end of grease supply chamber 30, 32, via an opening 35, 37. A function of grease supply chambers 30 and 32 is to provide a source of grease for system 10. One way check valves 77 and 79, or the like, may be installed in openings 35, 37 such that fluid may only flow in one direction, i.e., from grease supply chambers 30 and 32 to grease drive chambers 62 and 66, respectively. In one embodiment, grease supply chambers 30 and 32 are or accommodate replaceable grease canisters that may be connected to openings 35 and 37 by a threaded connection, or the like, at one end of each canister. Alternatively, grease supply chambers 30, 32 may be filled with grease. Grease supply chambers 30 and 32 may include a mechanism, such as pistons 34 and 36, for applying hydraulic push force against the grease supply, facilitating the discharge of grease from the chambers. Pistons 34 and 36 may be reusable, i.e. they may be removed from the grease supply chambers when chambers are emptied and be reinstalled into the refilled grease supply chambers. Pistons 34 and 36 may also provide a fluid seal within grease supply chambers 30 and 32, such that no fluid can flow from the space adjacent to one side of the piston to the space adjacent to the other side of the piston. In one embodiment, when grease supply chambers 30 and 32 are filled up with grease, pistons 34 and 36 are positioned within the chambers near the second end thereof such that all of the grease is on one side of pistons 34 and 36.

Main valve 21 communicates a drive fluid to the grease supply chambers and the grease injection assembly to generate a force to deliver the grease to the lines 80, 82. In an embodiment of system 10, main valve 21 has a first position and a second position. Main valve 21 is in communication with a source of compressed fluid via inlet 26. The fluid may be supplied to main valve 21 using a variety of known methods. In addition, the fluid may be hydraulic oil, air, carbon dioxide, nitrogen, etc. Main valve 21 is in communication with fluid supply lines 23, 25, 27 and 29. Fluid supply lines 23 and 27 are in communication with grease supply chambers 30 and 32, respectively, near the second ends of the chambers. Fluid supply line 25 is in communication with the space adjacent to piston face 70 of piston 52 inside main chamber 42. Similarly, fluid supply line 29 is in communication with the space adjacent to piston face 72 of piston 52 inside main chamber 42. Check valves 22 and 24 are placed along fluid supply lines 23 and 27, respectively, to allow the fluid to flow only in the direction of grease supply chambers 30 and 32. In the first position, main valve 21 directs the fluid from inlet 26 into fluid supply lines 23 and 25, while allowing fluid to be exhausted out of fluid supply line 29, for example through outlet 28. In the second position, main valve 21 directs the fluid from inlet 26 into fluid supply lines 27 and 29, while allowing fluid to be released out of fluid supply line 25.

When system 10 is in operation, main valve 21 is put into the first position, either by mechanical means or electrical means. As described above, main valve 21 in the first position directs compressed fluid from inlet 26, arrow A, into fluid supply lines 23 and 25, arrow B, while allowing fluid to be released from fluid supply line 29, arrow C.

Assuming the system is charged with grease, fluid flows through fluid supply line 25 into the space adjacent to piston face 70 of piston 52, thereby pushing piston 52, arrows D, towards channel 46 and consequently pushing plunger 56 further into channel 46. The fluid in the space adjacent to piston face 72 is simultaneously forced out of chamber 42 and exits through fluid supply line 29 and outlet 28. Grease drive chamber 66 is already charged with an amount of grease, before main valve 21 is put into the first position. The movement of plunger 56 into channel 46 increases the pressure in grease drive chamber 66, thereby opening valve 78. As a result, the grease in grease drive chamber 66 flows into outlet chamber 68 through opening 67 and then into grease supply line 82 which leads to a valve to be greased. The pressure exerted by plunger 56 on the grease in grease drive chamber 66 is much greater than that on piston face 70 of piston 52, due to the difference between the surface area of piston face 70 and the cross-sectional area of plunger 56. The greater the difference between the surface area of piston face 70 and the cross-sectional area of plunger 56, the more the pressure exerted by plunger 56 is amplified in relation to the fluid pressure on piston 52. As such, the magnitude of pressure may be varied for grease of different viscosity by adjusting the ratio of the surface area of piston face 70 to the cross-sectional area of plunger 56, and/or increasing the fluid pressure. The pressure in chamber 66 caused by the movement of plunger 56 into channel 46 facilitates the discharge of grease out of outlet chamber 68.

At the same time as the flow into line 25, fluid flows through fluid supply line 23 into the second end of grease supply chamber 30 and against one side of piston 34. The increase in fluid pressure pushes piston 34 and the grease on the other side of piston 34 towards opening 35 near the first end of chamber 30, and eventually the grease pushes valve 77 open and the grease flows into grease drive chamber 62. Piston 34 may simultaneously scrape off grease from the inner wall of chamber 30 while the piston moves within the chamber, in order to assist with keeping the grease separated from the fluid in chamber 30. As piston 52 moves towards channel 46, plunger 54 is simultaneously pulled out of channel 44, thereby creating suction (or negative pressure) in channel 44 and grease drive chamber 62. The suction caused by plunger 54 sliding out of channel 44 may facilitate the extraction of grease out of grease supply chamber 30. This process charges grease drive chamber 62 with an amount of grease.

Main valve 21 may be switched from the first position to the second position at specific time intervals, which may be done manually or by an automated system or timing device, as known to those skilled in the art. In the second position, fluid is released from fluid supply line 25 through exhaust 28. Check valve 22 prevents the fluid from flowing backwards in fluid supply line 23 and, as a result, the fluid pressure on piston 34 is maintained at substantially the same level as before main valve 21 is switched to the second position, except as alleviated to some degree by movement of piston 34. As one skilled in the art could appreciate, the purpose of check valve 22 is to maintain a substantially constant back pressure on the grease in chamber 30, such that the grease in grease supply chamber 30 is constantly pushed toward opening 35 to ensure that lower chamber 62 can always be charged. Valve 77 may be a pressure-sensitive valve such that it only opens when the suction in chamber 62 exceeds a certain threshold.

Also in the second position, main valve 21 directs compressed fluid from inlet 26 simultaneously to fluid supply lines 27 and 29. As fluid is flowing through fluid supply line 27 into the second end of grease supply chamber 32, the fluid pushes against piston 36 and, in turn, pushes the grease on the other side of piston 36 toward opening 37, thereby opening valve 79 and allowing grease to flow into grease drive chamber 66. During this process, fluid is simultaneously flowing into the space adjacent to piston face 72 in main chamber 42, thereby pushing piston 52 toward channel 44. The fluid in the space adjacent to piston face 70 is simultaneously forced out of chamber 42 and exits through fluid supply line 25 and outlet 28. Piston 36 may simultaneously scrape off grease from the inner walls of chamber 32 while the piston moves within the chamber, in order to assist with keeping the grease separated from the fluid in chamber 32. As piston 52 is moving toward channel 44, plunger 54 is pushed further into channel 44 while plunger 56 is pulled out of channel 46. As discussed above, grease drive chamber 62 was charged with an amount of grease, immediately before the switching of main valve 21. The movement of plunger 54 into channel 44 increases the pressure in grease drive chamber 62, thereby opening valve 76 and allowing the grease in grease drive chamber 62 to flow into outlet chamber 64 through opening 63 and then into grease supply line 80 which leads to a valve to be greased. The pressure exerted by plunger 54 on the grease in grease drive chamber 62 is much greater than that on piston face 72 of piston 52, due to the difference between the surface area of piston face 72 and the cross-sectional area of plunger 54. The greater the difference between the surface area of piston face 72 and the cross-sectional area of plunger 54, the more the pressure exerted by plunger 54 is amplified in relation to the fluid pressure on piston 52. The pressure in chamber 62 caused by the movement of plunger 54 into channel 44 facilitates the discharge of grease out of outlet chamber 64.

While fluid flows into fluid supply line 27, fluid is also flowing into supply line 29 at the same time, thereby exerting pressure on piston face 72 and simultaneously pulling plunger 56 out of channel 46. The movement of plunger 56 out of channel 46 creates suction (or negative pressure) in channel 46 and grease drive chamber 66. The suction caused by plunger 56 sliding out of channel 46 may facilitate the extraction of grease out of grease supply chamber 32. This process charges grease drive chamber 66 with an amount of grease.

Once grease drive chamber 66 is charged, main valve 21 may be switched from the second position to the first position, which may be accomplished by a variety of methods as known to those skilled in the art. When main valve 21 is switched back to the first position, fluid is directed into fluid supply lines 23 and 25 from inlet 26, while fluid may be exhausted from fluid supply line 29. Check valve 24 prevents the fluid from flowing backwards in fluid supply line 27 and, as a result, the fluid pressure on piston 36 is maintained at substantially the same level as before main valve 21 is switched to the first position. As one skilled in the art could appreciate, the purpose of check valve 24 is to maintain a substantially constant back pressure on the grease in grease supply chamber 32, such that the grease in grease supply chamber 32 is constantly pushed toward opening 37 to ensure that lower chamber 66 can always be recharged. Valve 79 may be a pressure-sensitive valve such that it only opens when the suction in chamber 66 exceeds a certain threshold.

As discussed above, when the fluid flows through fluid supply line 23 into the second end of grease supply chamber 30, piston 34 pushes the grease toward opening 35, thereby opening valve 77 and allowing grease to flow into grease drive chamber 62. During this process, piston 52 is simultaneously being pushed towards channel 46. The fluid in the space adjacent to piston face 72 is simultaneously forced out of chamber 42 and exits through fluid supply line 29 and outlet 28. As piston 52 is moving toward channel 46, plunger 56 is pushed further into channel 46 while plunger 54 is pulled out of channel 44. As discussed above, grease drive chamber 66 was charged with an amount of grease, immediately before the switching of main valve 21. The movement of plunger 56 into channel 46 increases the pressure in grease drive chamber 66, thereby opening valve 78. As a result, the grease in grease drive chamber 66 flows into outlet chamber 68 through opening 67 and then into grease supply line 82 which leads to a valve to be greased. During this phase, valve 79 functions to block opening 37 to prevent grease from backing up into supply chamber 32. The pressure exerted by plunger 56 on the grease in grease drive chamber 66 is much greater than that on piston face 70 of piston 52, due to the difference between the surface area of piston face 70 and the cross-sectional area of plunger 56. As a person skilled in the art could appreciate, the greater the difference between the surface area of piston face 70 and the cross-sectional area of plunger 56, the more the pressure exerted by plunger 56 is amplified in relation to the fluid pressure on piston 52.

As piston 52 is being pushed towards channel 46, plunger 54 is simultaneously being pulled out of channel 44, thereby creating suction in channel 44 and grease drive chamber 62. As discussed above, the suction caused by plunger 54 sliding out of channel 44 facilitates the extraction of grease out of grease supply chamber 30. This process recharges grease drive chamber 62 with an amount of grease. Once grease drive chamber 62 is charged, main valve 21 may be switched back to the second position wherein grease drive chamber 66 is charged with grease, and the grease from grease drive chamber 62 is discharged via grease supply line 80. Main valve 21 may be switched repeatedly as necessary to provide grease to a valve. The switching of main valve 21 may be done by manual operation, timed and automatic operation or remote operation, as known to those skilled in the art.

In one embodiment of system 10, grease drive chambers 62 and 66 may include a left stroke adjustment 58 and a right stroke adjustment 60, respectively. Stroke adjustments 58 and 60 can be employed to limit the stroke length of plungers 54 and 56, respectively. In an embodiment of system 10, stroke adjustments 58 and 60 may be screws or pegs having one end extending into grease drive chambers 62 and 66, respectively, in a position to block the movement of the plunger. The extended end may be positioned in the grease drive chamber to act as a stop against which the free end of plunger 54 or 56 may be stopped when the plunger is at a desired stroke length, such that the plunger cannot extend beyond a certain point within the grease drive chamber.

As one skilled in the art could appreciate, the size of grease drive chambers 62 and 66 and the stroke length of plungers 54 and 56 determine the amount of grease with which the grease drive chambers can be charged. Since different valves may require a different amount of grease, the grease drive chamber size and plunger stroke length may be varied to control the amount of grease to be discharged by system 10 at a given time.

A person skilled in the art could appreciate that as grease is periodically discharged from grease supply chambers 30 and 32, pistons 34 and 36 gradually move towards the second end of chambers 30 and 32, respectively, as chambers 30 and 32 are being emptied. In one embodiment of system 10, a magnet or a sensor may be incorporated into each of the pistons 34 and 36 such that the amount of grease remaining in chambers 30 and 32 may be gauged or monitored outside the chambers so that the chambers may be refilled or replaced accordingly.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. An apparatus for greasing a valve comprising:
   a main valve connected to a compressed fluid source, the main valve having a first position and a second position;
   a grease supply system having a supply of grease;
   a grease injection assembly comprising a main chamber, a left head assembly, a left channel in fluid communication with the left head assembly and extending from a first end of the main chamber to the left head assembly, a right head assembly and a right channel in fluid communication with the right head assembly and extending from a second end of the main chamber to the right head assembly, the grease injection assembly being in communication with the grease supply system and at least one grease supply line, and the at least one grease supply line being connectable into communication with the valve; and the main chamber having a piston therein forming a fluid seal between the first and second ends, the piston having a first piston face wherefrom a left plunger extends, and a second piston face wherefrom a right plungerextends, the left plunegplunger being inserted into the left channel and forming a fluidic seal between the main chamber and the left channel, and the right plunger being inserted into the right channel and forming a fluidic seal between the main chamber and the right channel, the piston being slidable from near the first end to near the second end of the main chamber and thereby move the right plunger into and out of the right chamber while alternately the left plungers is moved out of and into the left chamber; wherein in the first position, the main valve injects fluid into the first end of the main chamber, moving the piston towards the second end and simultaneously exhausting fluid from the second end, thereby retracting the left plunger from the left channel to thereby create a suction in and charge the left head assembly with grease from the grease supply system, and simultaneously driving the right plunger into the right channel to thereby discharge grease from the right head assembly into the at least one grease supply line; and wherein in the second position, the main valve injects fluid into the second end of the main chamber, moving the piston towards the first end and simultaneously exhausting fluid from the first end, thereby retracting the right plunger from the right channel to thereby create a suction in and charge the right head assembly with grease from the grease supply system, and simultaneously driving the left plunger into the left channel to thereby discharge grease from the left head assembly into the at least one grease supply line.

2. The apparatus of claim 1 wherein the left plunger has a cross-sectional area and the first piston face has a surface area, and wherein the surface area is great than the cross-sectional area.

3. The apparatus of claim 1 wherein the grease injection assembly further comprises a stroke adjustment device for controlling a stroke length of the left plunger and/or the right plunger.

4. The apparatus of claim 1 wherein the grease supply system comprises a first grease supply chamber and a second grease supply chamber, both containing grease, and
the left head assembly is in communication with the first grease supply chamber;
the right head assembly is in communication with the second grease supply chamber; and
the main valve is in communication with both the first and second grease supply chambers, and wherein
in the first position, the main valve injects fluid into the first grease supply chamber; and
in the second position, the main valve injects fluid into the second grease supply chamber.

5. The apparatus of claim 4 wherein the first grease supply chamber comprises therein a first piston, the first piston being slidable from a first end to a second end of the first grease supply chamber, and wherein the grease within the first grease supply chamber is disposed on a first side of the first piston; and wherein the fluid injected into the first grease supply chamber is disposed on a second side of the first piston.

6. The apparatus of claim 5 wherein the first piston incorporates a magnet.

7. The apparatus of claim 6 wherein the position of the first piston is gaugeable from outside the first grease supply chamber.

8. The apparatus of claim 5 wherein the first piston incorporates a sensor.

9. The apparatus of claim 8 wherein the position of the first piston is gaugeable from outside the first grease supply chamber.

10. The apparatus of claim 5 wherein the first piston removes grease from the inner surface of the first grease supply chamber as the first piston moves within the chamber.

11. The apparatus of claim 4 wherein the first grease supply chamber is a replaceable grease canister.

12. The apparatus of claim 4 wherein the main valve communicates with the first grease supply chamber via a grease supply line, the grease supply line having a device that prevents fluid from flowing back to the main valve, thereby maintaining back pressure on the grease within the first grease supply chamber.

13. The apparatus of claim 1 wherein the left head assembly comprises an outlet chamber connected to a grease drive chamber, and the right head assembly comprises an outlet chamber connected to a grease drive chamber, and the grease drive chambers being connected to the grease supply system, wherein in the first position, the grease drive chamber of the left head assembly is in communication with the grease supply system and is charged with grease from the grease supply system,
and
in the second position, the grease drive chamber of the right head assembly is in communication with the grease supply system and is charged with grease from the grease supply system.

14. The apparatus of claim 13 wherein the outlet chambers are in communication with the at least one grease supply line, and wherein in the first position, the outlet chamber of the left head assembly is fluidly sealed from the grease drive chamber of the left head assembly; the grease drive chamber of the right head assembly is fluidly sealed from the grease supply system; and
the outlet chamber of the right head assembly is in communication with the grease drive chamber of the right head assembly, such that grease is discharged into the outlet chamber of the right head assembly and flows into the at least one grease supply line, and
in the second position, the outlet chamber of the right head assembly is fluidly sealed from the grease drive chamber of the right head assembly; the grease drive chamber of the left head assembly is fluidly sealed from the grease supply system; and
and the outlet chamber of the left head assembly is in communication with the grease drive chamber of the left head assembly, such that grease is discharged into the outlet chamber of the left head assembly and flows into the at least one grease supply line.

15. The apparatus of claim 13 wherein the outlet chambers are in communication with the at least one grease supply line; wherein
in the first position, the outlet chamber of the left head assembly is fluidly sealed from the grease drive chamber of the left head assembly; the grease drive chamber of the right head assembly is fluidly sealed from the grease supply system; and drive chamber of the right head assembly, such that grease is discharged into the outlet chamber of the right head assembly and flows into the at least one grease supply line, and in the second position, the outlet chamber of the right head assembly is fluidly sealed from the grease drive chamber of the right head assembly; the grease drive chamber of the left head assembly is fluidly sealed from the grease supply system; and and the outlet chamber of the left head assembly is in communication with the grease drive chamber of the left head assembly, such that grease is discharged into the outlet chamber of the left head assembly and flows into the at least one grease supply line; and wherein the grease drive chamber of the left head assembly is in communication with the left channel, and the grease drive chamber of the right head assembly is in communication with the right channel; and wherein in the first position, the left plunger slides towards the second end of the main chamber, thereby creating negative pressure in the left channel and in the grease drive chamber of the left head assembly;

the right plunger slides towards the grease drive chamber of the right head assembly, thereby creating pressure in the right channel and in the grease drive chamber of the right head assembly; and in the second position, the right plunger slides towards the first end of the main chamber, thereby creating negative pressure in the right channel and in the grease drive chamber of the right head assembly;

the left plunger slides towards the grease drive chamber of the left head assembly, thereby creating pressure in the left channel and in the grease drive chamber of the left head assembly.

16. The apparatus of claim 1 wherein the grease supply system precharges the left head assembly and the right head assembly with grease under pressure.

17. A lubricating device for greasing a ball valve comprising:
- a first grease head having a first inner chamber with a fixed volume;
- a first grease supply for the first grease head including a first grease supply chamber and a first piston for applying a pressure to the grease supply chamber;
- a first greasing line extending from the first grease head to a connection connectable to a first port on the ball valve;
- a second grease head having a second inner chamber with a fixed volume;
- a second grease supply for the second grease head including a second grease supply chamber and a second piston for applying a pressure to the second grease supply chamber;
- a second greasing line extending from the second grease head to a connection connectable to a second port on the ball valve;
- a single drive piston including: a first grease plunger connected on a first piston face of the single drive piston, the first grease plunger protruding into the first inner chamber and being moveable within the first inner chamber as driven by the single drive piston to vary a capacity of the first inner chamber and a second grease plunger connected on a second piston face of the single drive piston, the second piston face being opposite the first piston face, the second grease plunger protruding into the second inner chamber and being moveable within the second inner chamber as driven by the single drive piston to vary a capacity of the second inner chamber; and
- a controller for applying an external supply of pressurized fluid alternately to the first piston face and the second piston face,
- the lubricating device being configured to alternate between:
  (i) a first state wherein the controller applies pressurized fluid to the second piston face (a) to drive the first plunger into the first inner chamber to discharge grease from the first grease head into the first greasing line and (b) simultaneously to retract partially the second plunger from the second inner chamber to draw grease from the second grease supply into the second grease head; and
  (ii) a second state wherein the controller applies pressurized fluid to the first piston face (a) to drive the second plunger into the second inner chamber to discharge grease from the second grease head into the second greasing line and (b) simultaneously to retract partially the first plunger from the first inner chamber to draw grease from the first grease supply into the first grease head.

18. The lubricating device of claim 17 wherein in the first state, the controller simultaneously applies pressurized fluid to the second piston to maintain a pressure on the second grease supply chamber.

19. The lubricating device of claim 17 wherein the pressurized fluid is pressurized gas.

* * * * *